(12) United States Patent
Datta et al.

(10) Patent No.: US 12,315,110 B2
(45) Date of Patent: May 27, 2025

(54) USING INTEGRATED SYSTEM TO ENHANCE A REFERENCE IMAGE

(71) Applicant: Honeywell International Inc., Charlotte, NC (US)

(72) Inventors: Indranil Datta, Bangalore (IN); Jitendra Sitaram Chaurasia, Bengaluru (IN); Vijay Dhamija, Cumming, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 430 days.

(21) Appl. No.: 17/743,138

(22) Filed: May 12, 2022

(65) Prior Publication Data

US 2023/0368336 A1   Nov. 16, 2023

(51) Int. Cl.
| | |
|---|---|
| G06T 5/00 | (2024.01) |
| G06N 3/045 | (2023.01) |
| G06T 3/40 | (2006.01) |
| G06T 5/50 | (2006.01) |

(52) U.S. Cl.
CPC ............... *G06T 5/00* (2013.01); *G06N 3/045* (2023.01); *G06T 3/40* (2013.01); *G06T 5/50* (2013.01); *G06T 2207/20084* (2013.01)

(58) Field of Classification Search
None
See application file for complete search history.

(56) References Cited

U.S. PATENT DOCUMENTS

2022/0253990 A1* 8/2022 Kumar .................. G06N 3/047
2022/0261958 A1* 8/2022 Akkaraju ................. G06T 7/90

FOREIGN PATENT DOCUMENTS

| CN | 110503610 A | 11/2019 |
|---|---|---|
| WO | 2021035629 A1 | 3/2021 |

OTHER PUBLICATIONS

Malav et al ("DHSGAN: An End to End Dehazing Network for Fog and Smoke," Advances in Databases and Information Systems, Springer International Publishing, May 26, 2019, CHAM, pp. 593-608, XP04750828 [retrieved on Jul. 8, 2024]) (Year: 2019).*
Kim et al ("Deep Illumination-Aware Dehazing With Low-Light and Detail Enhancement," IEEE Transactions on Intelligent Transportation Systems, vol. 23, No. 3, Mar. 2022 [retrieved on Jul. 12, 2024]) (Year: 2022).*

(Continued)

*Primary Examiner* — Leon Viet Q Nguyen
(74) *Attorney, Agent, or Firm* — Seager, Tufte & Wickhem, LLP

(57) ABSTRACT

A method for enhancing a reference image includes processing the reference image via a generator network to provide an enhanced image by applying a first pre-processing to the reference image and then applying a plurality of first layers of residual blocks to extract features. A first post-processing is then applied. A conversion layer, such as one of a night vision conversion layer and an air pollution conversion layer, is then applied. A plurality of second layers of residual blocks are applied after one of the night vision conversion layer and the air pollution conversion layer are applied, and then a second post-processing is applied which includes upscaling the output of the plurality of second layers of residual blocks, resulting in the enhanced image.

20 Claims, 12 Drawing Sheets

(56) References Cited

OTHER PUBLICATIONS

Kim, G., et al., "Deep Illumination-Aware Dehazing With Low-Light and Detail Enhancement," IEEE Transactions on Intelligent Transportation Systems, vol. 23, No. 3, Mar. 2022.

Malav, R., et al., "DHSGAN: An End to End Dehazing Network for Fog and Smoke," Advances in Databases and Information Systems, Springer International Publishing, CHAM, pp. 593-608, XP04750828 [retrieved on May 26, 2019].

Extended European Search Report, EP Application No. 23170354.7, European Patent Office, Oct. 6, 2023 (12 pgs).

Zhu et al., "A Fast Single Image Haze Removal Algorithm Using Color Attenuation Prior", IEEE Transactions on Image Processing, vol. 24, No. 11, pp. 3522-3533, Nov. 2015.

"Cognitech the Best Before & After", Video Enhancement Software, pp. 1-13, May 11, 2022.

"Convolutional Neural Network", Wikipedia, pp. 1-36, Feb. 14, 2022.

Dong et al., "Fast Efficient Algorithm for Enhancement of Low Lighting Video", IEEE, pp. 1-6, 2011.

"Generative Adversarial Network", Wikipedia, pp. 1-12, Feb. 28, 2022.

Ngo et al., "Improved Color Attenuation Prior for Single-Image Haze Removal", Applied Sciences, pp. 1-22, 2019.

Isola et al., "Image-to-Image Translation With Conditional Adversarial Networks", IEEE, pp. 1125-1134. 2017.

Ledig et al., "Photo-Realistic Single Image Super-Resolution Using a Generative Adversarial Network", IEEE, pp. 4681-4690. 2017.

Anoosheh et al., "Night-to-Day Image Translation for Retrieval-based Localization", pp. 1-7. 2019.

"Residual Neural Network", Wikipedia, pp. 1-3, Mar. 17, 2022.

"Video Super-Resolution", Wikipedia, pp. 1-18, Feb. 14, 2022.

Zeiler et al., "Visualizing and Understanding Convolutional Networks", pp. 818-833, 2014.

Saurab, CDS Batch 1 Capstone Project Presentations Session, India Institute of Science, https://www.youtube.com/watch?v=9P-CTXKN27A (beginning at time 4:01:41 for GAN). 7 pages, Streamed Live Oct. 22, 2021. Viewed Jul. 13, 2022.

\* cited by examiner

USING INTEGRATED SYSTEM TO ENHANCE A REFERENCE IMAGE

TECHNICAL FIELD

The present disclosure pertains generally to video processing and more particularly to video processing for enhancing poor quality video frames.

BACKGROUND

Video cameras are widely used for monitoring an area of interest. In some cases, the video frames provided by at least some of the video cameras may be of poor quality due to a variety of reasons. For example, poor lighting may make it difficult to easily see objects or other details within the video frames, particularly if the video frames are captured at night or under other low lighting conditions. Atmospheric conditions such as air pollution, smoke, fog, heavy rain or even snow can also affect the quality of video frames. A need remains for improved systems and methods for improving the quality of video frames produced under sub-optimal conditions such as poor lighting and poor atmospheric conditions.

SUMMARY

This disclosure relates generally to systems and methods for improving the quality of video frames produced under sub-optimal conditions such as poor lighting and poor atmospheric conditions. An example may be found in a method for enhancing a reference image. The method includes processing the reference image via a generator network to provide an enhanced image by applying a first pre-processing to the reference image, resulting in a first pre-processed reference image data, and applying a plurality of first layers of residual blocks to the first pre-processed reference image data to extract features from the first pre-processed reference image data. Processing the reference image via the generator network further includes applying a first post-processing to an output of the plurality of first layers of residual blocks, resulting in a first post processed reference image data, and applying one of a night vision conversion layer and an air pollution conversion layer to the first post processed reference image data, resulting in a converted first post processed reference image data. Processing the reference image via the generator network further includes applying a plurality of second layers of residual blocks to the converted first post processed reference image data to extract features from the converted first post processed reference image data and applying a second post-processing to an output of the plurality of second layers of residual blocks, the second post-processing comprising upscaling the output of the plurality of second layers of residual blocks, resulting in the enhanced image.

The illustrative method further includes processing the enhanced image and the reference image as inputs to a discriminator network, wherein the discriminator network attempts to identify at least a threshold dissimilarity between the enhanced image and the reference image. When the discriminator network identifies at least the threshold dissimilarity between the enhanced image and the reference image, the enhanced image is rejected. When the discriminator network does not identify at least the threshold dissimilarity between the enhanced image and the reference image, the enhanced image is accepted.

Another example may be found in a non-transient computer readable medium that stores instructions. When the instructions are executed by one or more processors, the one or more processors are caused to process a reference image via a generator network to provide an enhanced image, which includes extracting features from at least part of the reference image, resulting in a first set of reference image data, and applying at least one of a night vision conversion layer and an air pollution conversion layer to at least part of the first set of reference image data, resulting in a second set of reference image data. The one or more processors are further caused to extract features from at least part of the second set of reference image data, and to produce an enhanced image based at least in part on the second set of reference image data.

Another example may be found in a system for enhancing a reference image. The system includes a generator network for processing the reference image. The generator network is configured to extract features from at least part of the reference image, resulting in a first set of reference image data, apply at least one of a night vision conversion layer and an air pollution conversion layer to at least part of the first set of reference image data, resulting in a second set of reference image data, extract features from at least part of the second set of reference image data, and produce an enhanced image based at least in part on the second set of reference image data.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
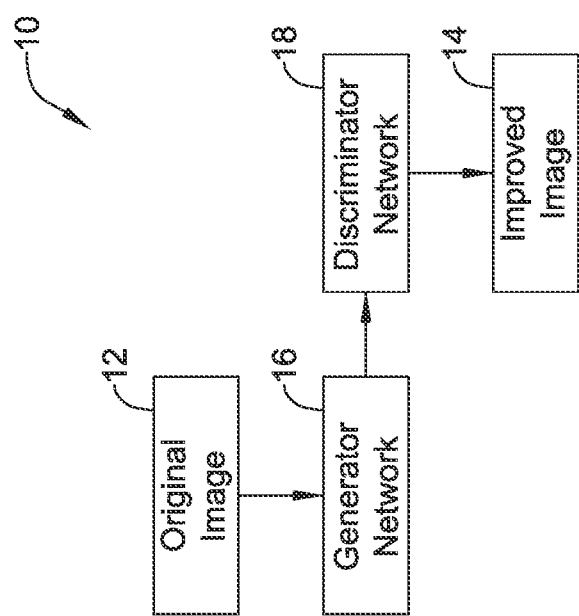
FIG. 1 is a schematic block diagram of an illustrative system for enhancing a reference image.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative system 10 for improving an image, such as an original image 12, to convert the original image 12 into an improved image 14. The system 10 includes a generator network 16 and a discriminator network 18. The generator network 16 may be a Generative Adversarial Network (GAN), but this is not required. The generator network 16 may be configured to process a reference image such as the original image 12 to provide an enhanced image. In some instances, processing a reference image includes a number of steps, including applying a first pre-processing to the reference image, resulting in a first pre-processed reference image data, and applying a plurality of first layers of residual blocks to the first pre-processed reference image data to extract features from the first pre-processed reference image data. The generator network 16 may be further configured to apply a first post-processing to an output of the plurality of first layers of residual blocks, resulting in a first post processed reference image data, and to apply one or more conversion layers such as one of a night vision conversion layer and an air pollution conversion layer, to the first post processed reference image data, resulting in a converted first post processed reference image data.

In some cases, the generator network 16 may be configured to apply a night vision conversion layer that is configured to enhance low lighting pixels in the first post processed reference image data. The night vision conversion layer may be configured to invert the first post processed reference image data, resulting in an inverted image data, apply non-linear corrections to the inverted image data, resulting in a corrected inverted image data, and invert the corrected inverted image data. In some cases, the generator network 16 may be configured to apply an air pollution conversion layer that is configured to remove haze from the first post processed reference image data. It is contemplated that the haze may be caused by, for example, one or more atmospheric conditions such as air pollution, smoke, fog, rain, snow and/or other condition. In some cases, the air pollution conversion layer may be configured to receive one or more air pollution parameters from one or more pollution sensors, determine an air pollution index based at least in part on the one or more air pollution parameters, and use to the air pollution index in defining a constraint in removing haze from the first post processed reference image data.

The generator network 16 may be configured to apply a plurality of second layers of residual blocks to the converted first post processed reference image data to extract features from the converted first post processed reference image data, and to apply a second post-processing to an output of the plurality of second layers of residual blocks, resulting in an enhanced image. The second post-processing may include upscaling the output of the plurality of second layers of residual blocks.

Applying the night vision conversion layer and/or the air pollution conversion layer before upscaling the image may help reduce the processing power needed to perform the night vision conversion layer and/or the air pollution conversion. Also, applying the plurality of second layers of residual blocks after applying the night vision conversion layer and/or the air pollution conversion layer may help identify features that are enhanced by the night vision conversion layer and/or the air pollution conversion.

In some instances, the generator network 16 may include artificial intelligence, and the generator network 16 may be trained using a set of training images. As an example, the set of training images may include a set of night vision training images and/or a set of air pollution training images.

The discriminator network 18 is configured to process the enhanced image and the reference image as inputs to determine whether at least a threshold dissimilarity between the enhanced image and the reference image can be identified. When the discriminator network 18 identifies at least the threshold dissimilarity between the enhanced image and the reference image, the discriminator network rejects the enhanced image. When the discriminator network 18 does not identify at least the threshold dissimilarity between the enhanced image and the reference image, the discriminator network 18 accepts the enhanced image and provides the accepted enhanced image as the improved image 14. In some cases, the discriminator network 18 may be configured to determine a content loss in the enhanced image relative to the reference image, and the threshold dissimilarity may correspond to a threshold content loss. In some cases, the discriminator network 18 includes artificial intelligence, and the discriminator network 18 may be trained using a set of training images.

Figure 2:
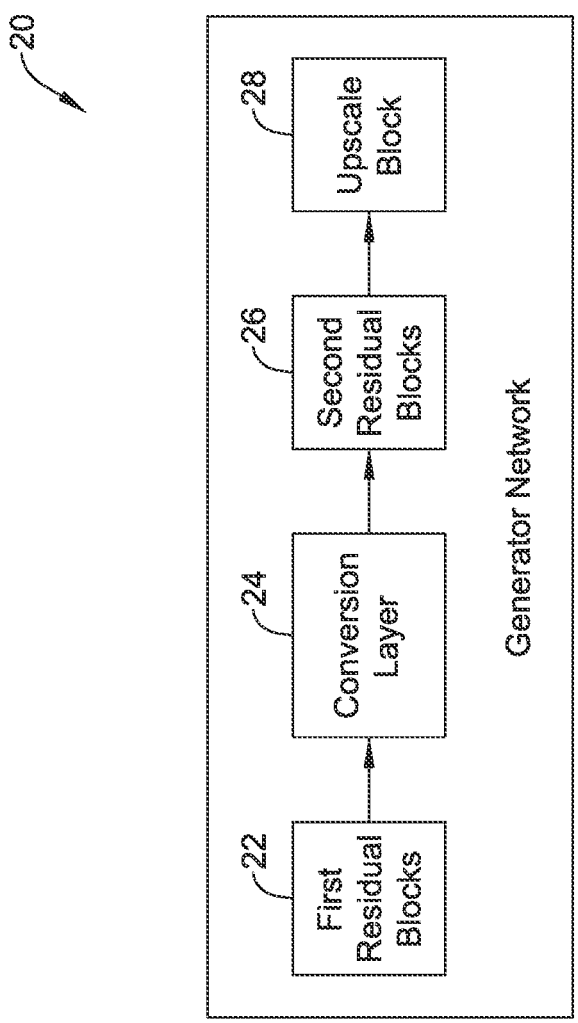
FIG. 2 is a schematic block diagram of a portion of the illustrative system of FIG. 1.

FIG. 2 is a schematic block diagram of an illustrative generator network 20. The illustrative generator network 20 may be considered as being an example of the generator network 16 shown in FIG. 1. The illustrative generator network 20 includes a first residual blocks 22 that may include any number of individual residual blocks. The generator network 20 also includes a conversion layer 24 that is configured to receive an output from the first residual blocks 22. The conversion layer 24 may include a night vision conversion layer that is configured to improve an image that was taken under poor lighting conditions, for example. The conversion layer 24 may include an air pollution conversion layer that is configured to improve an image that was taken during high air pollution, heavy fog, heavy rain, snow, or dust storm conditions, for example. These are just example conversion layers.

The conversion layer 24 outputs to a second residual blocks 26 that may include any number of residual blocks. The second residual blocks 26 output to an upscale block 28. The upscale block 28 may include several blocks, with each block including layers such as a convolutional layer, a first pixel shuffler layer, a second pixel shuffler layer, and a Parametric Rectified Linear Activation Function (PReLU) layer.

In some cases, the first residual blocks 22 include a neural network (e.g. a Generative Adversarial Network (GAN)) with one or more activation maps, and when the discriminator network 18 identifies at least the threshold dissimilarity between the enhanced image and the reference image, the discriminator network 18 notifies the generator network 16, and in response, the generator network 16 modifies one or more of the activation maps of the plurality of first layers of residual blocks. In some cases, the second residual blocks 26 include a neural network (e.g. a Generative Adversarial Network (GAN)) with one or more activation maps, and when the discriminator network 18 identifies at least the threshold dissimilarity between the enhanced image and the reference image, the discriminator network 18 notifies the generator network 16, and in response, the generator network 16 modifies one or more of the activation maps of the plurality of second layers of residual blocks.

Figure 3:
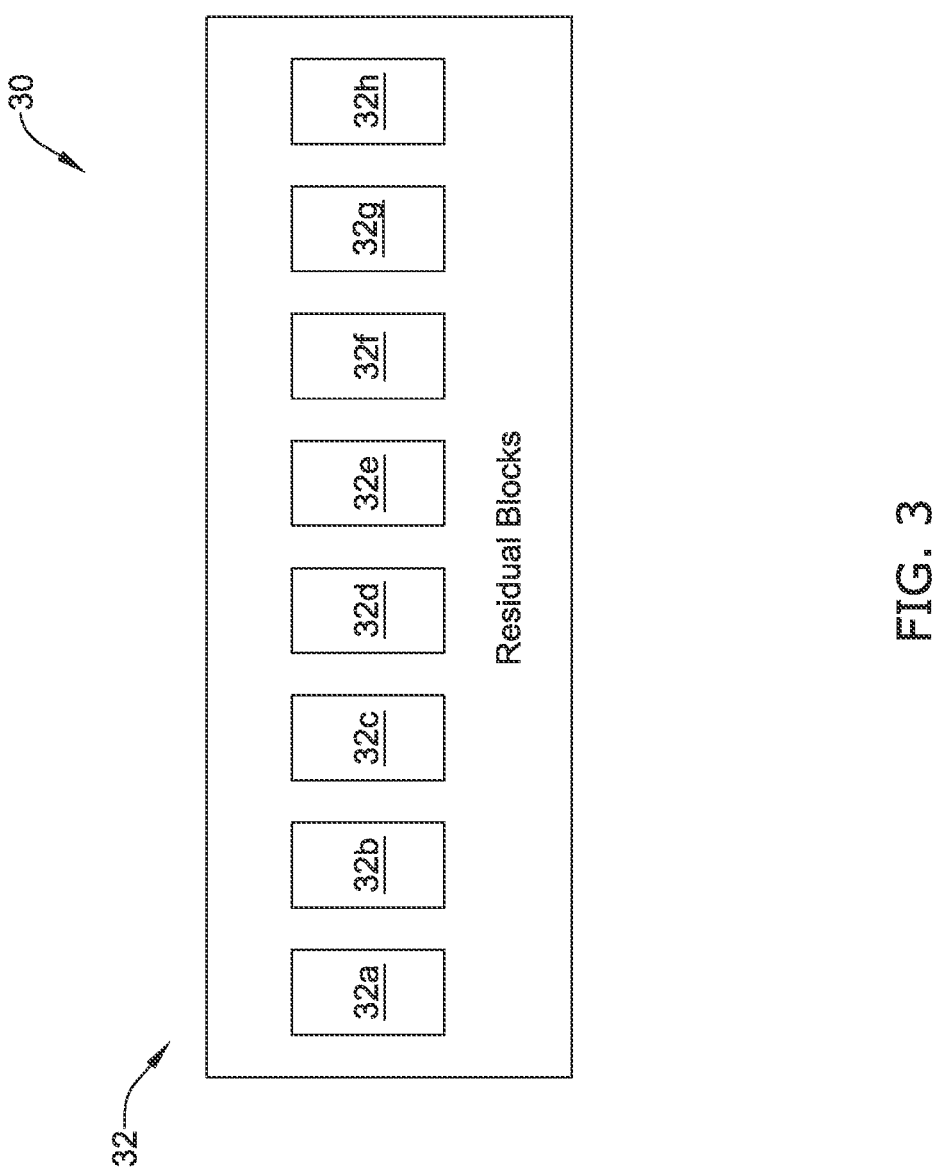
FIG. 3 is a schematic block diagram of a portion of FIG. 2.

FIG. 3 is a schematic block diagram of a set 30 of residual blocks. The set 30 of residual blocks may be considered as representing the first residual blocks 22 or the second residual blocks 26, for example. In some cases, a first instance of set 30 of residual blocks represents the first residual block, and a second instance of set 30 of residual blocks represents the second residual block. The set 30 of residual blocks includes a number of residual blocks 32, individually labeled as 32*a*, 32*b*, 32*c*, 32*d*, 32*e*, 32*f*, 32*g* and 32*h*. In some cases, the set 30 of residual blocks may include less than eight blocks 32, or may include nine or more blocks 32. In some cases, each of the blocks 32 may include the same layers.

Figure 4:
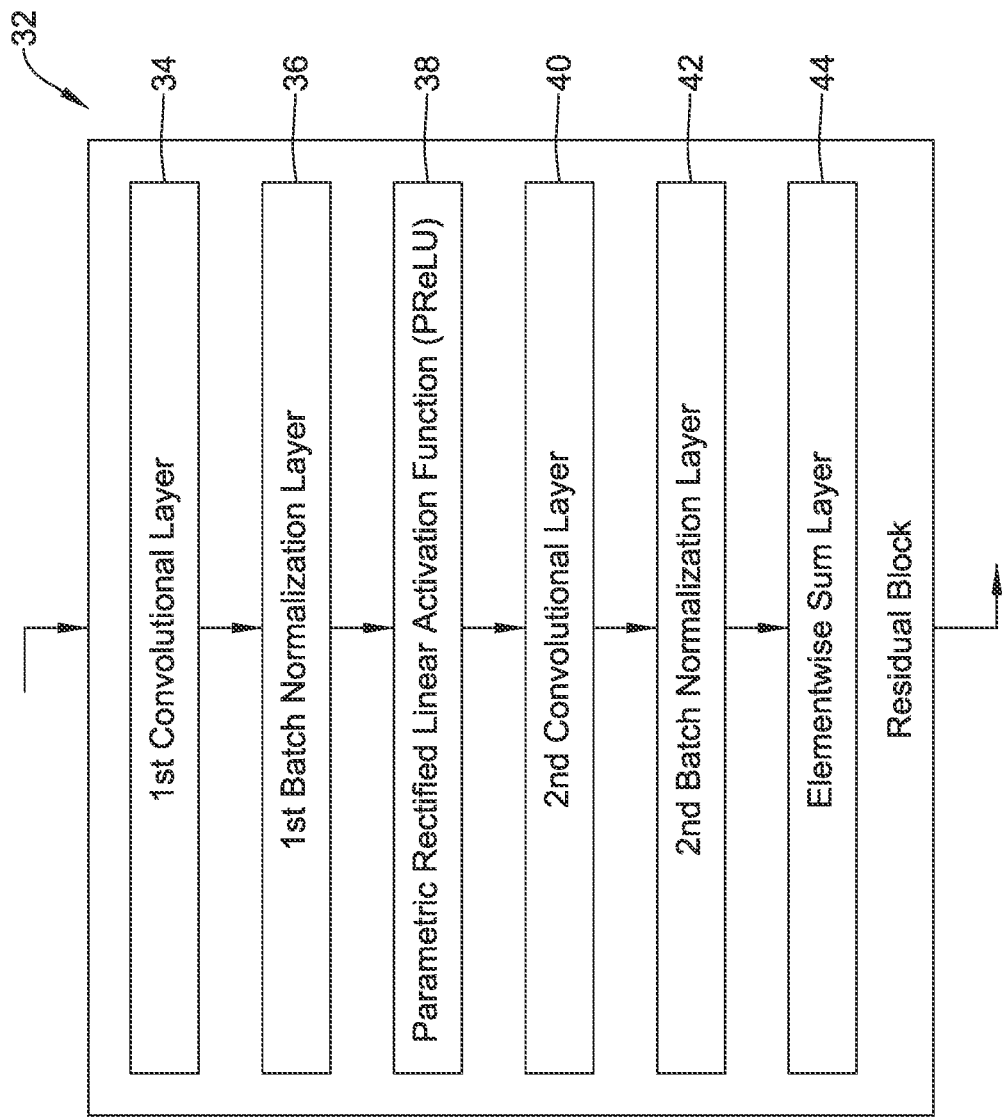
FIG. 4 is a schematic block diagram of a portion of FIG. 3.

FIG. 4 is a schematic block diagram of one of the residual blocks 32 that may be considered as representing a block within the first residual blocks 22 and/or the second residual blocks 26. In some cases, each of the blocks within the first residual blocks 22 is identical to each of the blocks within the second residual blocks 26. In the example shown, the block 32 includes a convolutional layer 34, a batch normalization layer 36, a Parametric Rectified Linear Activation Function (PReLU) layer 38, a convolutional layer 40, a batch normalization layer 42 and an elementwise sum layer 44.

Figure 5:
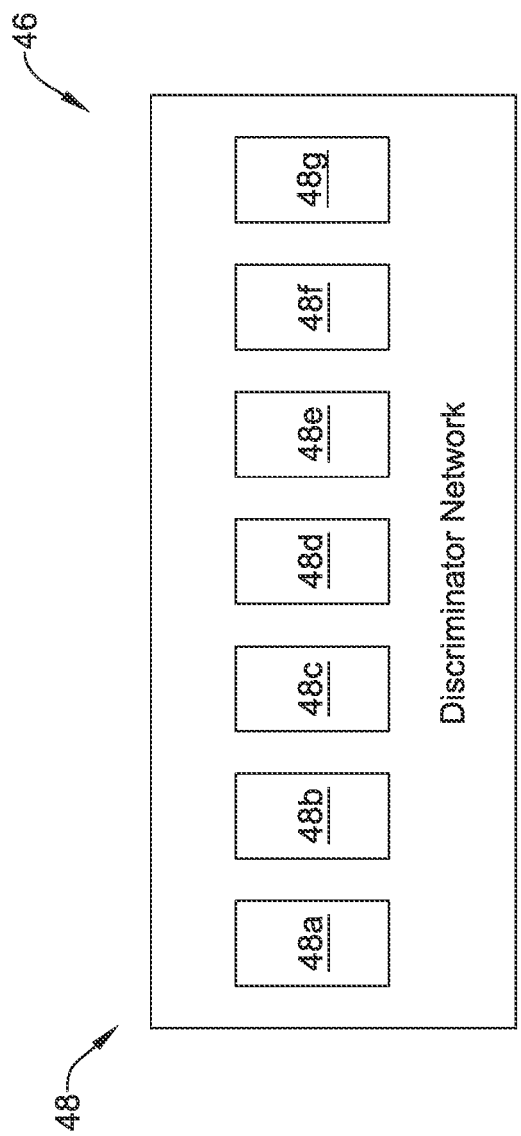
FIG. 5 is a schematic block diagram of a portion of the illustrative system of FIG. 1.

FIG. 5 is a schematic block diagram of an illustrative discriminator network 46. The illustrative discriminator network 46 may be considered as being an example of the discriminator network 18, for example, and may be a neural network that is trained to differentiate between the enhanced images and the corresponding reference images. The discriminator network 46 may include any number of blocks 48, individually labeled as 48*a*, 48*b*, 48*c*, 48*d*, 48*e*, 48*f* and 48*g*. In some cases, the discriminator network 46 may include six or fewer blocks 48. In some cases, the discriminator network 46 may include eight or more blocks 48.

Figure 6:
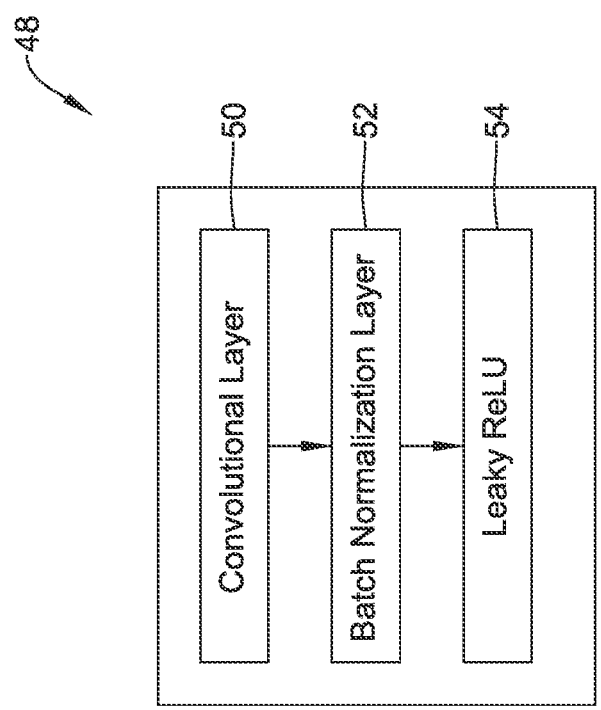
FIG. 6 is a schematic block diagram of a portion of FIG. 5.

FIG. 6 is a schematic block diagram of one of the blocks 48 of FIG. 5. In this example, the block 48 includes a convolutional layer 50, a batch normalization layer 52 and a Leaky ReLU layer 54. Each of the blocks 48 within the illustrative discriminator network 46 may include the same layers.

Figure 7:
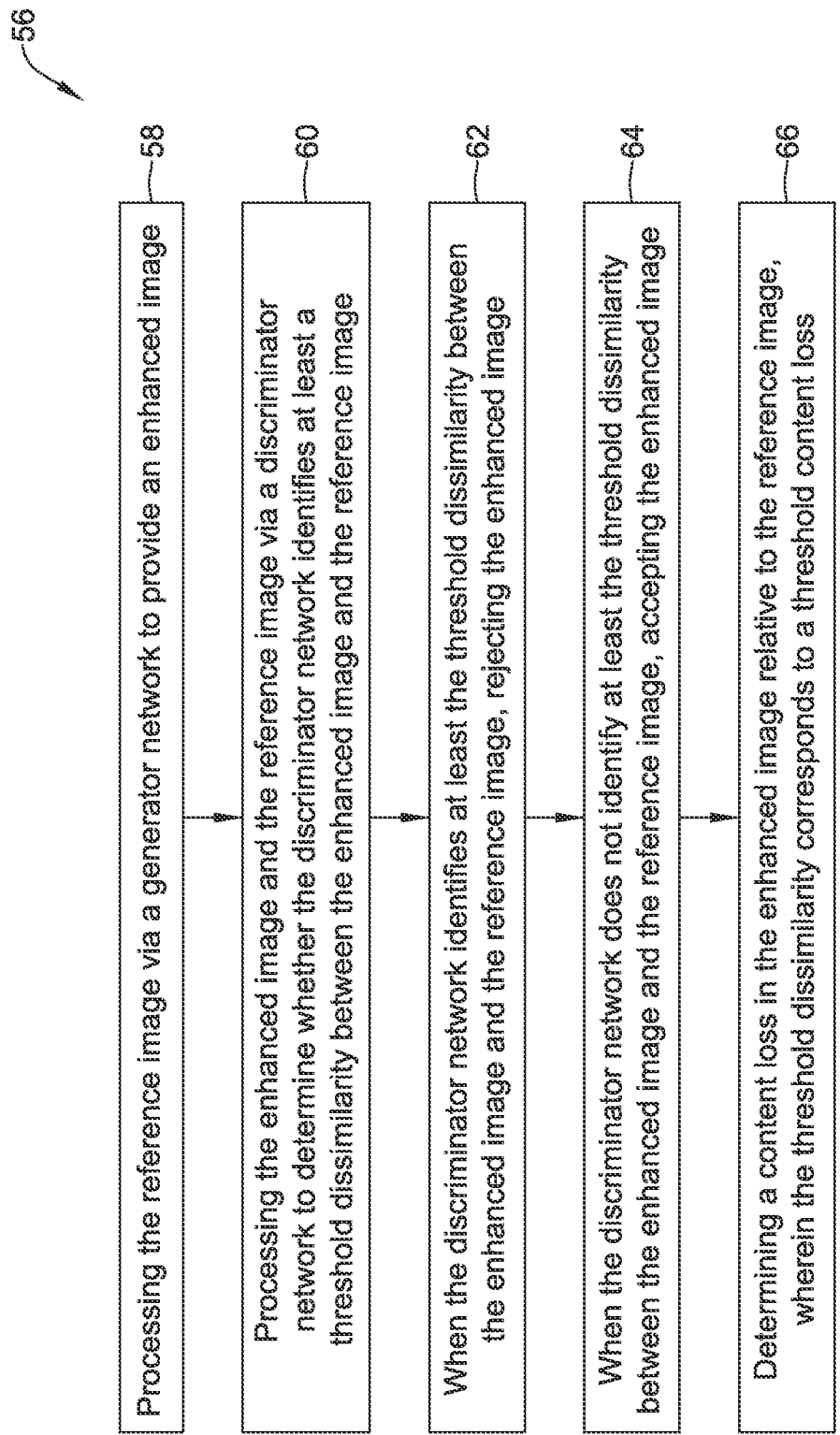
FIG. 7 is a flow diagram showing an illustrative method for enhancing a reference image.

FIG. 7 is a flow diagram showing an illustrative method 56 for enhancing a reference image. The method 56 includes processing the reference image via a generator network (such as the generator network 16 or the generator network 20) to provide an enhanced image, as indicated at block 58. The enhanced image and the reference image are processed via a discriminator network (such as the discriminator network 18 or the discriminator network 46) to determine whether the discriminator network identifies at least a threshold dissimilarity between the enhanced image and the reference image, as referenced at block 60. When the discriminator network identifies at least the threshold dissimilarity between the enhanced image and the reference image, the enhanced image is rejected, as indicated at block 62. When the discriminator network does not identify at least the threshold dissimilarity between the enhanced image and the reference image, the enhanced image is accepted, as indicated at block 64. In some cases, the method 56 may further include determining a content loss in the enhanced image relative to the reference image, and the threshold dissimilarity may at least in part correspond to a threshold content loss, as indicated at block 66.

In some instances, the generator network may include artificial intelligence, and the method 56 may include training the generator network using a set of training images. The set of training images may include a set of night vision training images and/or a set of air pollution training images, for example. In some instances, the discriminator network may include artificial intelligence, and the method 56 may include training the discriminator network using a set of training images.

Figure 8:
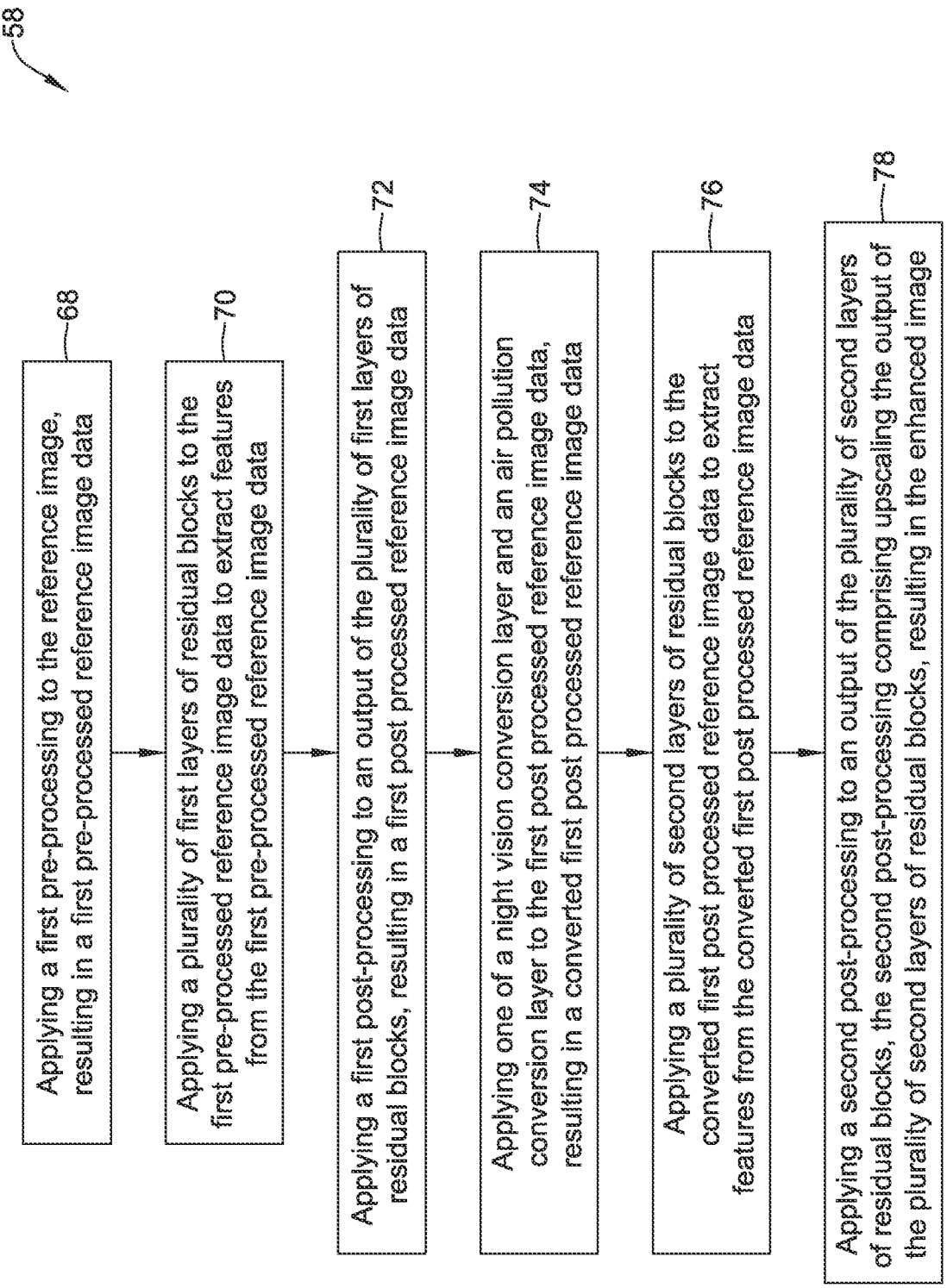
FIG. 8 is a flow diagram showing an illustrative method for processing a reference image via a generator network.

FIG. 8 is a flow diagram showing an illustrative method 58 of processing the reference image via the generator network (such as the generator network 16 or the generator network 20), providing greater detail regarding the block 58 shown in FIG. 7. In this example, processing the reference image via the generator network includes applying a first pre-processing to the reference image, resulting in a first pre-processed reference image data, as indicated at block 68. First pre-processing may include applying a convolution layer and a Parametric Rectified Linear Activation Function (PReLU) layer 38. A plurality of first layers of residual blocks are applied to the first pre-processed reference image data to extract features from the first pre-processed reference image data, as indicated at block 70. In some instances, each of the plurality of first layers of residual blocks include a first convolutional layer, a first batch normalization layer, a Parametric Rectified Linear Activation Function (PReLU), a second convolutional layer, a second batch normalization layer, and an elementwise sum layer. A first post-processing is applied to an output of the plurality of first layers of residual blocks, resulting in a first post processed reference image data, as indicated at block 72. First post-processing may include applying a convolutional layer, a batch normalization layer and an elementwise sum layer.

One of a night vision conversion layer and an air pollution conversion layer are then applied to the first post processed reference image data, resulting in a converted first post processed reference image data, as indicated at block 74. In some instances, the night vision conversion layer, when applied, may be configured to enhance low lighting pixels in the first post processed reference image data. The night vision conversion layer may, for example, be configured to invert the first post processed reference image data, resulting in an inverted image data, apply non-linear corrections to the inverted image data, resulting in a corrected inverted image data, and invert the corrected inverted image data. The air pollution conversion layer, when applied, may be configured to remove haze from the first post processed reference image data. The air pollution conversion layer may, in some cases, be configured to receive one or more air pollution parameters from one or more pollution sensors, determine an air pollution index based at least in part on the one or more air pollution parameters, and use to the air pollution index in defining one or more constraints in removing haze from the first post processed reference image data.

In the example shown, a plurality of second layers of residual blocks are applied to the converted first post processed reference image data to extract features from the converted first post processed reference image data, as indicated at block 76. A second post-processing is applied to an output of the plurality of second layers of residual blocks. Second post-processing may include applying a convolutional layer, a batch normalization layer and an elementwise sum layer. The second post-processing resulting in the enhanced image. In some cases, the second post-processing includes upscaling, as indicated at block 78. In some cases, each of the plurality of second layers of residual blocks include a first convolutional layer, a first batch normalization layer, a Parametric Rectified Linear Activation Function (PReLU), a second convolutional layer, a second batch normalization layer, and an elementwise sum layer.

In some instances, the plurality of first layers of residual blocks may include a neural network with one or more activation maps, and when the discriminator network identifies at least the threshold dissimilarity between the enhanced image and the reference image, the discriminator network notifies the generator network, and in response, the generator network modifies one or more of the activation maps of the plurality of first layers of residual blocks. In some cases, the plurality of second layers of residual blocks may include a neural network with one or more activation maps, and when the discriminator network identifies at least the threshold dissimilarity between the enhanced image and the reference image, the discriminator network notifies the generator network, and in response, the generator network modifies one or more of the activation maps of the plurality of second layers of residual blocks.

Figure 9:
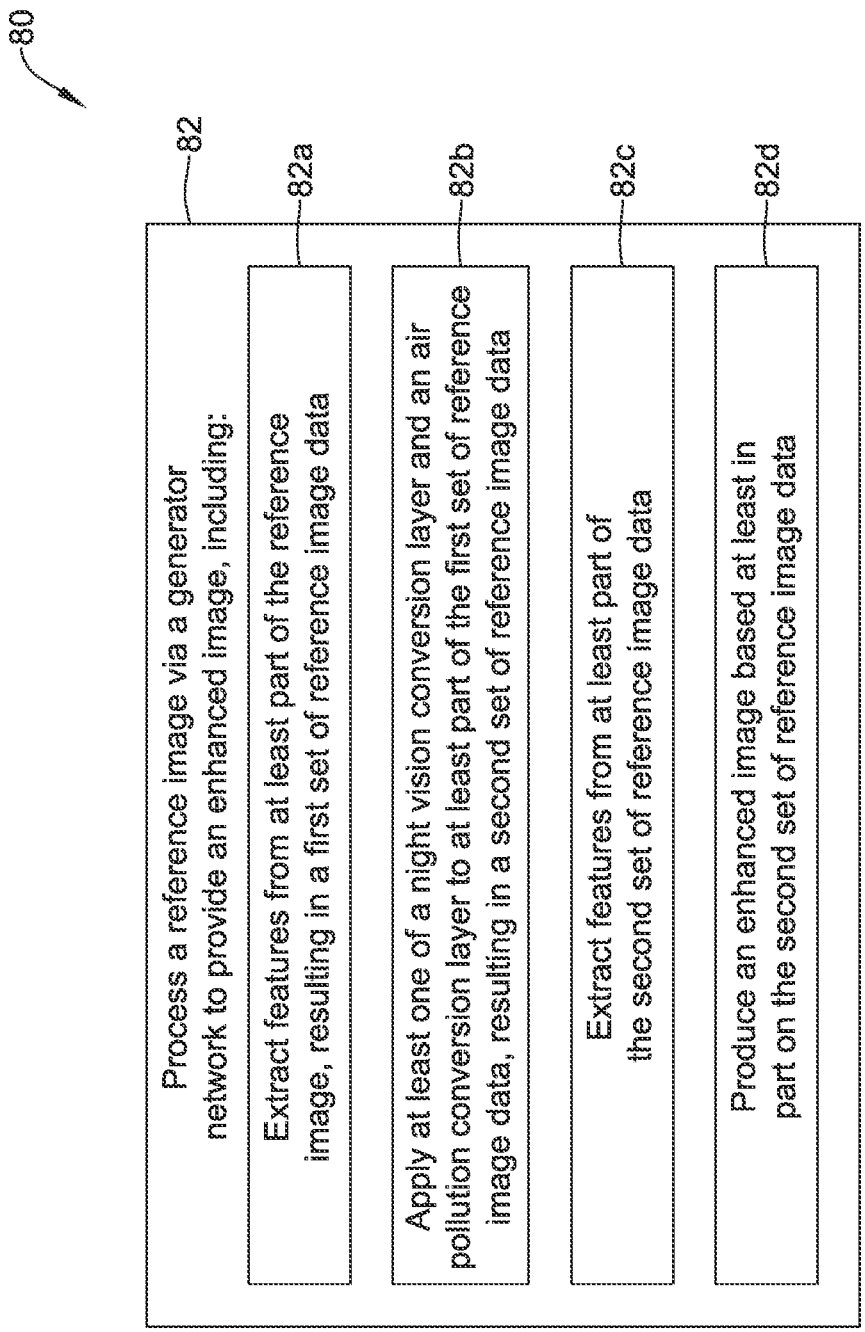
FIG. 9 is a flow diagram showing an illustrative series of steps that may be carried out via one or more processors when the one or more processors execute a set of instructions.

FIG. 9 is a flow diagram showing an illustrative series of steps 80 that may be carried out by one or more processors that are executing executable instructions stored on a non-transient, computer-readable storage medium. The one or more processors may be caused to process a reference image via a generator network (such as the generator network 16 or the generator network 20) to provide an enhanced image, as indicated at block 82. In some cases, this may include extracting features from at least part of the reference image, resulting in a first set of reference image data, as indicated at block 82a. This may further include applying at least one of a night vision conversion layer and an air pollution conversion layer to at least part of the first set of reference image data, resulting in a second set of reference image data, as indicated at block 82b. Features may be extracted from at least part of the second set of reference image data, as indicated at block 82c. An enhanced image may be produced based at least in part on the second set of reference image data, as indicated at block 82d.

In some instances, the one or more processors may be caused to process the enhanced image and the reference image via a discriminator network (such as the discriminator network 18 or the discriminator network 46) to determine whether the discriminator network identifies at least a threshold dissimilarity between the enhanced image and the reference image. In some instances, the one or more processors may be caused to determine a content loss in the enhanced image relative to the reference image, wherein the threshold dissimilarity corresponds at least in part to a threshold content loss.

In some cases, the generator network may include a neural network with one or more activation maps, and when the discriminator network identifies at least the threshold dissimilarity between the enhanced image and the reference image, the instructions cause the one or more processors to have the discriminator network notify the generator network, and in response, the generator network modifies one or more of the activation maps of the generator network. The generator network may include artificial intelligence, and wherein the instructions cause the one or more processors to train the generator network using a set of training images.

Figure 10:
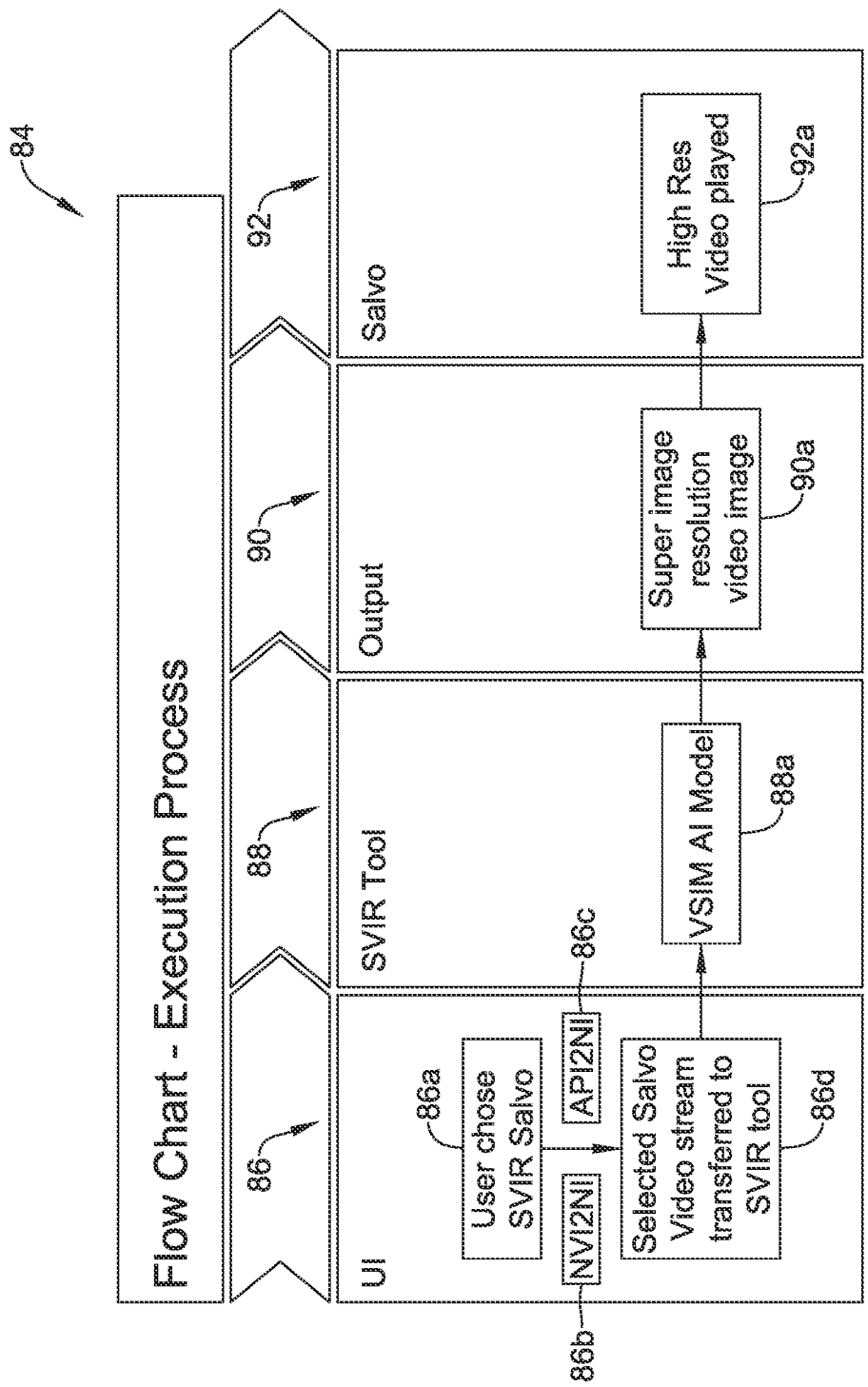
FIG. 10 is a flow diagram showing an illustrative method.

FIG. 10 is a flow diagram showing an illustrative method 84 for processing video images. The method 84 is divided into sections based on where the individual steps are carried out, including a UI (user interface) section 86, an SVIR (super video image resolution) section 88, an Output section 90 and a Salvo section 92, with process flow flowing left to right as indicated. In the UI section 86, a user chooses to utilize the SVIR tool, as indicated at block 86a. The user is able to select between NVI2NI (Night Vision Image to Normal Image) at block 86b, or API2NI (Air Pollution Image to Normal Image) at block 86c. Next, the selected video is transferred to the SVIR tool, as indicated at block 86d. In the SCIR section 88, a VSIM AI (artificial intelligence) model is used, as indicated at block 88a. A Super Image Resolution Video Image is created within block 90a of the Output section 90. In the Salvo section 92, the resulting high resolution video is played, as indicated at block 92a.

Figure 11:
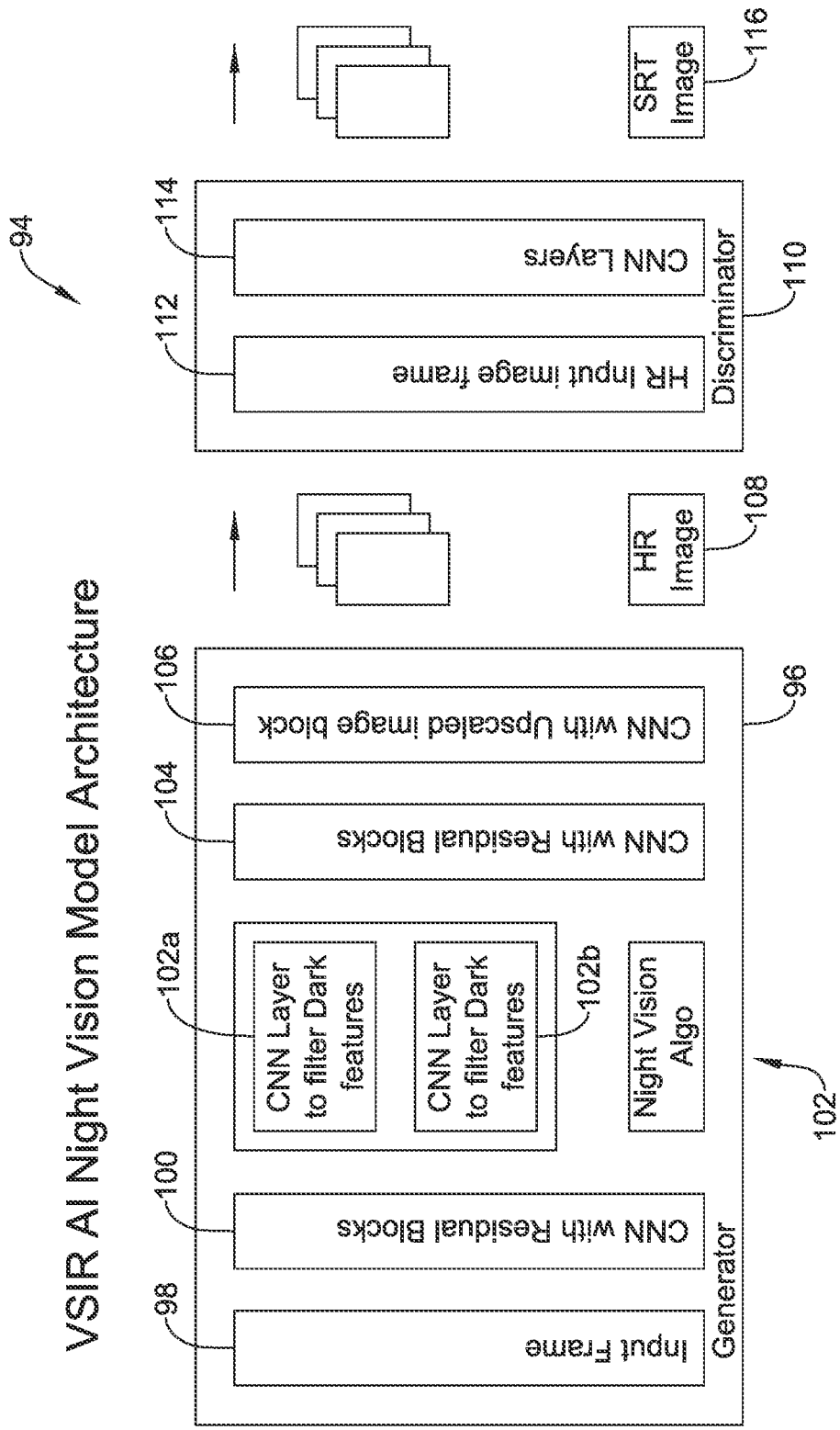
FIG. 11 is a schematic block diagram of an illustrative architecture for processing night vision images.

FIG. 11 is a schematic block diagram of an illustrative architecture 94 for processing night vision images. The illustrative architecture 94 includes a generator 96 that may be considered as an example of the generator network 16 or the generator network 20. The generator 96 includes an Input Frame 98 and a CNN (Convolution Neural Network) with Residual Blocks 100. Output from the CNN with Residual Blocks 100 passes to a Night Vision Algorithm 102. In some cases, the Night Vision Algorithm 102 includes a CNN Layer 102a that is configured to filter dark features and a CNN Layer 102b that is configured to filter dark features. Output from the Night Vision Algorithm 102 passes to a CNN with Residual Blocks 104 and then to a CNN with Upscaling Block 106. Output from the CNN with Upscaling Block 106 is now a high resolution image 108. The high resolution image 108 passes to a discriminator 110 that may be considered as an example of the discriminator network 18 or the discriminator network 46. The discriminator 110 includes an HR Input Image Frame 112 and a CNN Layers block 114. Output form the discriminator 110 is a super high resolution image 116.

Figure 12:
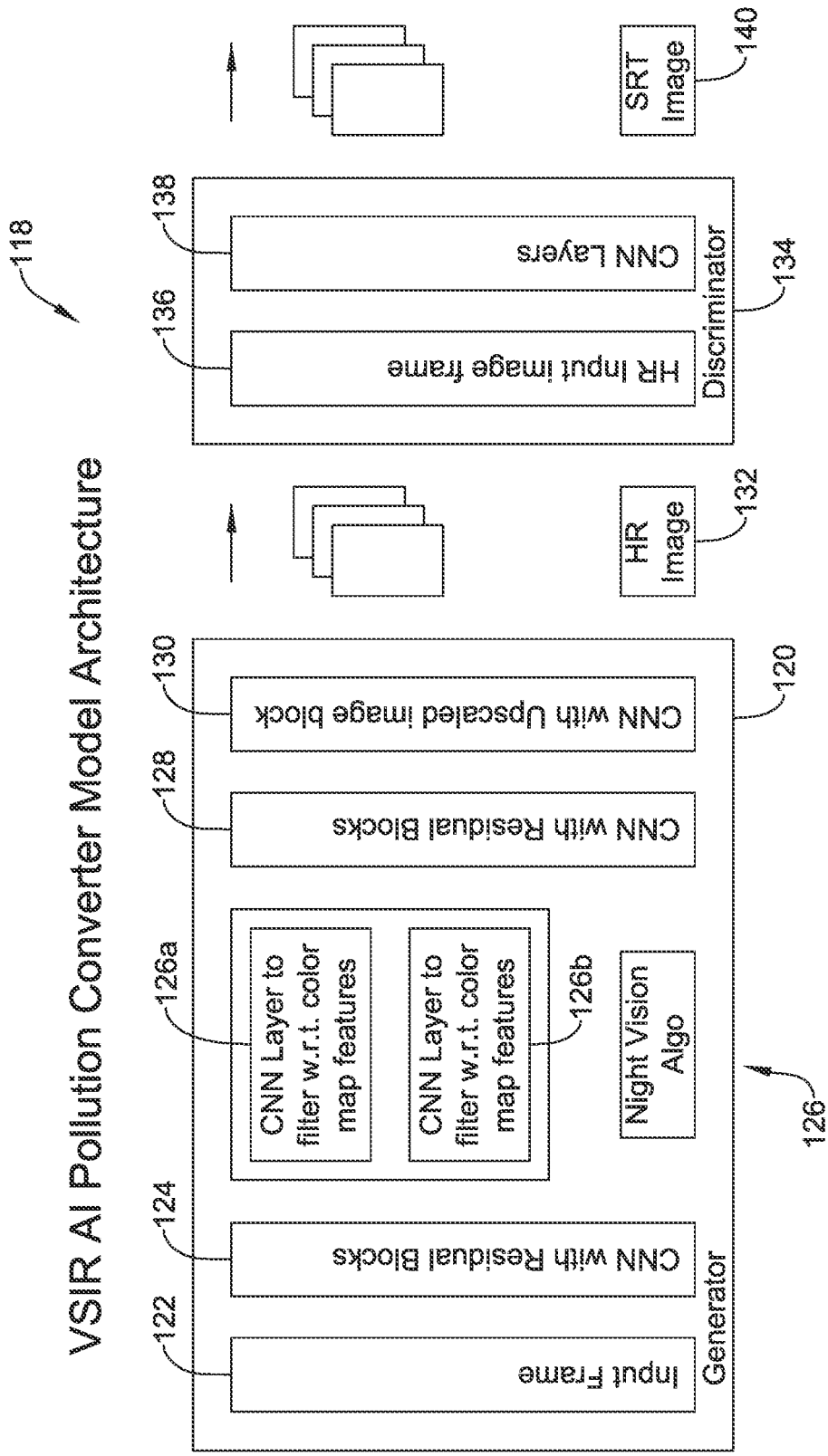
FIG. 12 is a schematic block diagram of an illustrative architecture for processing air pollution images.

FIG. 12 is a schematic block diagram of an illustrative architecture 118 for processing air pollution images. The illustrative architecture 118 includes a generator 120 that may be considered as an example of the generator network 16 or the generator network 20. The generator 96 includes an Input Frame 122 and a CNN (Convolution Neural Network)

with Residual Blocks 124. Output from the CNN with Residual Blocks 124 passes to a Pollution Converter Algorithm 126. In some cases, the Pollution Converter Algorithm 126 includes a CNN Layer 126*a* that is configured to filter with respect to color map features and a CNN Layer 126*b* that is configured to filter with respect to color map features. Output from the Pollution Converter Algorithm 126 passes to a CNN with Residual Blocks 128 and then to a CNN with Upscaling Block 130. Output from the CNN with Upscaling Block 130 is now a high resolution image 132. The high resolution image 132 passes to a discriminator 134 that may be considered as an example of the discriminator network 18 or the discriminator network 46. The discriminator 134 includes an HR Input Image Frame 136 and a CNN Layers block 138. Output form the discriminator 134 is a super high resolution image 140.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for enhancing a reference image, the method comprising:
    processing the reference image via a generator network to provide an enhanced image, wherein processing the reference image via the generator network comprises:
        applying a first pre-processing to the reference image, resulting in a first pre-processed reference image data, the first pre-processing includes applying a convolution layer and a Parametric Rectified Linear Activation Function (PReLU) layer to the reference image;
        applying a plurality of first layers of residual blocks to the first pre-processed reference image data to extract features from the first pre-processed reference image data, resulting in an output;
        applying a first post-processing to the output of the plurality of first layers of residual blocks, including applying a convolution layer, a batch normalization layer and an elementwise sum layer, resulting in a first post processed reference image data;
        after the first post processed reference image data is generated by the first post processing, applying one of a night vision conversion layer that is configured to enhance low lighting pixels in the first post processed reference image data or an air pollution conversion layer that is configured to remove haze from the first post processed reference image data, resulting in a converted first post processed reference image data;
        applying a plurality of second layers of residual blocks to the converted first post processed reference image data to extract features from the converted first post processed reference image data;
        applying a second post-processing to an output of the plurality of second layers of residual blocks, the second post-processing comprising upscaling the output of the plurality of second layers of residual blocks, resulting in the enhanced image;
    processing the enhanced image and the reference image via a discriminator network to determine whether the discriminator network identifies at least a threshold dissimilarity between the enhanced image and the reference image;
    when the discriminator network identifies at least the threshold dissimilarity between the enhanced image and the reference image, rejecting the enhanced image; and
    when the discriminator network does not identify at least the threshold dissimilarity between the enhanced image and the reference image, accepting the enhanced image.

2. The method of claim 1, wherein each of the plurality of first layers of residual blocks comprises:
    applying a first convolutional layer;
    applying a first batch normalization layer;
    apply a Parametric Rectified Linear Activation Function (PReLU);
    applying a second convolutional layer;
    applying a second batch normalization layer; and
    applying an elementwise sum layer.

3. The method of claim 1, wherein the night vision conversion layer is configured to enhance low lighting pixels in the first post processed reference image data.

4. The method of claim 3, wherein the night vision conversion layer is configured to:
    invert the first post processed reference image data, resulting in an inverted image data;
    apply non-linear corrections to the inverted image data, resulting in a corrected inverted image data; and
    invert the corrected inverted image data.

5. The method of claim 1, wherein the air pollution conversion layer is configured to remove haze from the first post processed reference image data.

6. The method of claim 5, wherein the air pollution conversion layer is configured to:
    receive one or more air pollution parameters from a pollution sensor;
    determine an air pollution index based at least in part on the one or more air pollution parameters; and
    use to the air pollution index in defining a constraint in removing haze from the first post processed reference image data.

7. The method of claim 1, further comprising:
    determining a content loss in the enhanced image relative to the reference image; and
    wherein the threshold dissimilarity corresponds to a threshold content loss.

8. The method of claim 1, wherein the plurality of first layers of residual blocks comprise a neural network with one or more activation maps, and when the discriminator network identifies at least the threshold dissimilarity between the enhanced image and the reference image, the discriminator network notifies the generator network, and in response, the generator network modifies one or more of the activation maps of the plurality of first layers of residual blocks.

9. The method of claim 1, wherein the plurality of second layers of residual blocks comprise a neural network with one or more activation maps, and when the discriminator network identifies at least the threshold dissimilarity between the enhanced image and the reference image, the discriminator network notifies the generator network, and in response, the generator network modifies one or more of the activation maps of the plurality of second layers of residual blocks.

10. The method of claim 1, wherein the generator network comprises artificial intelligence, and wherein the method includes training the generator network using a set of training images.

11. The method of claim 10, wherein the set of training images includes a set of night vision training images and/or a set of air pollution training images.

12. The method of claim 1, wherein the discriminator network comprises artificial intelligence, and wherein the method includes training the discriminator network using a set of training images.

13. A non-transitory computer readable medium storing instructions that when executed by one or more processors cause the one or more processors to:
receive one or more air pollution parameters from a pollution sensor;
determine an air pollution index based at least in part on the one or more air pollution parameters;
process a reference image via a generator network to provide an enhanced image, including:
extract features from at least part of the reference image, resulting in a first set of reference image data;
apply an air pollution conversion layer to at least part of the first set of reference image data, resulting in a second set of reference image data, wherein the air pollution conversion layer is configured to use the air pollution index in defining a constraint in removing a haze from the first post processed reference image data;
extract features from at least part of the second set of reference image data; and
produce an enhanced image based at least in part on the second set of reference image data.

14. The non-transitory computer readable medium of claim 13, wherein the instructions when executed by the one or more processors cause the one or more processors to:
process the enhanced image and the reference image via a discriminator network to determine whether the discriminator network identifies at least a threshold dissimilarity between the enhanced image and the reference image.

15. The non-transitory computer readable medium of claim 14, wherein the instructions when executed by the one or more processors cause the one or more processors to:
determine a content loss in the enhanced image relative to the reference image; and
wherein the threshold dissimilarity corresponds to a threshold content loss.

16. The non-transitory computer readable medium of claim 14, wherein the generator network comprises a neural network with one or more activation maps, and when the discriminator network identifies at least the threshold dissimilarity between the enhanced image and the reference image, the instructions cause the one or more processors to have the discriminator network notify the generator network, and in response, the generator network modifies one or more of the activation maps of the generator network.

17. The non-transitory computer readable medium of claim 13, wherein the generator network comprises artificial intelligence, and wherein the instructions cause the one or more processors to train the generator network using a set of training images.

18. A system for enhancing a reference image, the system comprising:
an input for receiving one or more air pollution parameters from a pollution sensor;
one or more processors configured to determine an air pollution index based at least in part on the one or more air pollution parameters;
the one or more processors configured to implement a generator network for processing the reference image, the generator network configured to:
extract features from at least part of the reference image, resulting in a first set of reference image data;
apply an air pollution conversion layer to at least part of the first set of reference image data, resulting in a second set of reference image data, wherein the air pollution conversion layer is configured to use the air pollution index in defining a constraint in removing a haze from the first post processed reference image data;
extract features from at least part of the second set of reference image data; and
produce an enhanced image based at least in part on the second set of reference image data.

19. The system of claim 18, further comprising:
a discriminator network configured to process the enhanced image and the reference image to determine whether there is at least a threshold dissimilarity between the enhanced image and the reference image.

20. The system of claim 19, wherein the generator network comprises a neural network with one or more activation maps, and when the discriminator network identifies at least the threshold dissimilarity between the enhanced image and the reference image, the discriminator network is configured to notify the generator network, and in response, the generator network modifies one or more of the activation maps of the generator network.

* * * * *